United States Patent
Nekuii (10) Patent No.: US 10,796,220 B2
(45) Date of Patent: Oct. 6, 2020

(54) SYSTEMS AND METHODS FOR VECTORIZED FFT FOR MULTI-DIMENSIONAL CONVOLUTION OPERATIONS

(71) Applicant: Cavium, LLP, Santa Clara, CA (US)

(72) Inventor: Mehran Nekuii, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 733 days.

(21) Appl. No.: 15/593,235

(22) Filed: May 11, 2017

(65) Prior Publication Data

US 2017/0344880 A1 Nov. 30, 2017

Related U.S. Application Data

(60) Provisional application No. 62/340,944, filed on May 24, 2016.

(51) Int. Cl.
| | |
|---|---|
| *G06N 3/04* | (2006.01) |
| *G06F 17/14* | (2006.01) |
| *G06F 17/15* | (2006.01) |
| *G06N 20/10* | (2019.01) |
| *G06N 3/063* | (2006.01) |

(52) U.S. Cl.
CPC ......... *G06N 3/0454* (2013.01); *G06F 17/142* (2013.01); *G06F 17/153* (2013.01); *G06N 3/063* (2013.01); *G06N 20/10* (2019.01)

(58) Field of Classification Search
None
See application file for complete search history.

(56) References Cited

U.S. PATENT DOCUMENTS

| | | | |
|---|---|---|---|
| 10,438,117 B1 | 10/2019 | Ross et al. | |
| 2002/0198911 A1* | 12/2002 | Blomgren | ............... G06F 7/762 |
| | | | 708/232 |

(Continued)

OTHER PUBLICATIONS

Vinayak Gokhale, Nn-X—a hardware accelerator for convolutional neural networks, Purdue University Open Access Theses, https://docs.lib.purdue.edu/open_access_theses/72 , 2004, Total pp. 56 (Year: 2014).*

(Continued)

*Primary Examiner* — Alan Chen (57) ABSTRACT

A new approach is proposed to support efficient convolution for deep learning by vectorizing multi-dimensional input data for multi-dimensional fast Fourier transform (FFT) and direct memory access (DMA) for data transfer. Specifically, a deep learning processor (DLP) includes a plurality of tensor engines each configured to perform convolution operations by applying one or more kernels on multi-dimensional input data for pattern recognition and classification based on a neural network, wherein each tensor engine includes, among other components, one or more vector processing engines each configured to vectorize the multi-dimensional input data at each layer of the neural network to generate a plurality of vectors and to perform multi-dimensional FFT on the generated vectors and/or the kernels to create output for the convolution operations. Each tensor engine further includes a data engine configured to prefetch the multi-dimensional data and/or the kernels to both on-chip and external memories via DMA.

21 Claims, 10 Drawing Sheets

(56) References Cited

U.S. PATENT DOCUMENTS

2015/0039856 A1* 2/2015 Pitsianis ............. G06F 9/30032
712/12
2017/0132496 A1* 5/2017 Shoaib ..................... G06K 9/66

OTHER PUBLICATIONS

Gokhale et al., A 240 G-ops/s Mobile Coprocessor for Deep Neural Networks, CVPR2014 Workshop, pp. 682-687 (Year: 2014).*
Song Han, et al., "Deep Compression: Compressing Deep Neural Networks with Pruning, Trained Quantization and Huffman Coding", Published as a conference paper at ICLR 2016, 14 pages.

* cited by examiner

SYSTEMS AND METHODS FOR VECTORIZED FFT FOR MULTI-DIMENSIONAL CONVOLUTION OPERATIONS

CROSS-REFERENCE TO RELATED APPLICATIONS

This application claims the benefit of U.S. Provisional Patent Application No. 62/340,944, filed May 24, 2016, and entitled "MULTI-DIMENSIONAL CONVOLUTION USING VECTORIZED FFT PROCESSING," which is incorporated herein in its entirety by reference.

This application is related to co-pending U.S. patent application Ser. No. 15/582,420, filed Apr. 28, 2017, and entitled "SYSTEMS AND METHODS FOR DEEP LEARNING PROCESSOR," which is incorporated herein in its entirety by reference.

BACKGROUND

Deep learning is a type of machine learning that utilizes a cascade of layers of nonlinear processing units for feature extraction and classification. Deep learning has many potential applications including but not limited to, computer vision for robotics and self-driving cars, which includes image search, capture, classification, and face detection; natural language processing, which includes text analytics, machine translation, language models, and sentiment analysis; speech and emotion understanding, which includes voice search, voice activated assistant, dialog and conversation; enterprise applications and security, which includes malware detection/clutter classification, fraud detection, recommendation systems, and advertising; and cognitive computing and artificial intelligence, which includes decision support and recommendation systems.

Convolution is one of the main operations to be performed for deep learning, wherein a kernel, which is a multi-dimensional (e.g., three- or four-dimensional) matrix or template having its own values for elements in the matrix, is applied to input data (e.g., image) for pattern identification and classification. In some embodiments, both the input data and the kernel in a normal space are converted/transformed to Fourier space via, for example, fast Fourier transform (FFT), where element by element multiplication is performed and then output of the FFT is reverted back to the normal space via inverse FFT as the result of the convolution. As the computational complexity increases with larger kernel size and higher number of data dimensions, it is desirable to be able to implement FFT in an efficient manner.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support efficient convolution for deep learning by vectorizing multi-dimensional input data for multi-dimensional fast Fourier transform (FFT) and direct memory access (DMA) for data transfer. Specifically, a deep learning processor (DLP) includes a plurality of tensor engines each configured to perform convolution operations by applying one or more kernels on multi-dimensional input data for pattern recognition and classification based on a neural network, wherein each tensor engine includes, among other components, one or more vector processing engines each configured to vectorize the multi-dimensional input data at each layer of the neural network to generate a plurality of vectors and to perform multi-dimensional FFT on the generated vectors and/or the kernels to create output for the convolution operations. Each tensor engine further includes a data engine configured to prefetch the multi-dimensional data and/or the kernels to both on-chip and external memories via DMA.

By performing both vectorization and data transfer of the multi-dimensional input data efficiently, the proposed approach achieves efficient convolution operations, which count for the majority portion of computations for deep learning processing especially when the kernel size and the data dimensions increase. In addition, both the kernel and the input data are read from the memories in a sequential order under the proposed approach, which maximizes DMA performance. Although deep learning is used hereinafter as a non-limiting example to illustrate the proposed approach of vectorized FFT for multi-dimensional convolution, the proposed approach is also applicable to other types of applications involving multi-dimensional convolution operations.

Figure 1:
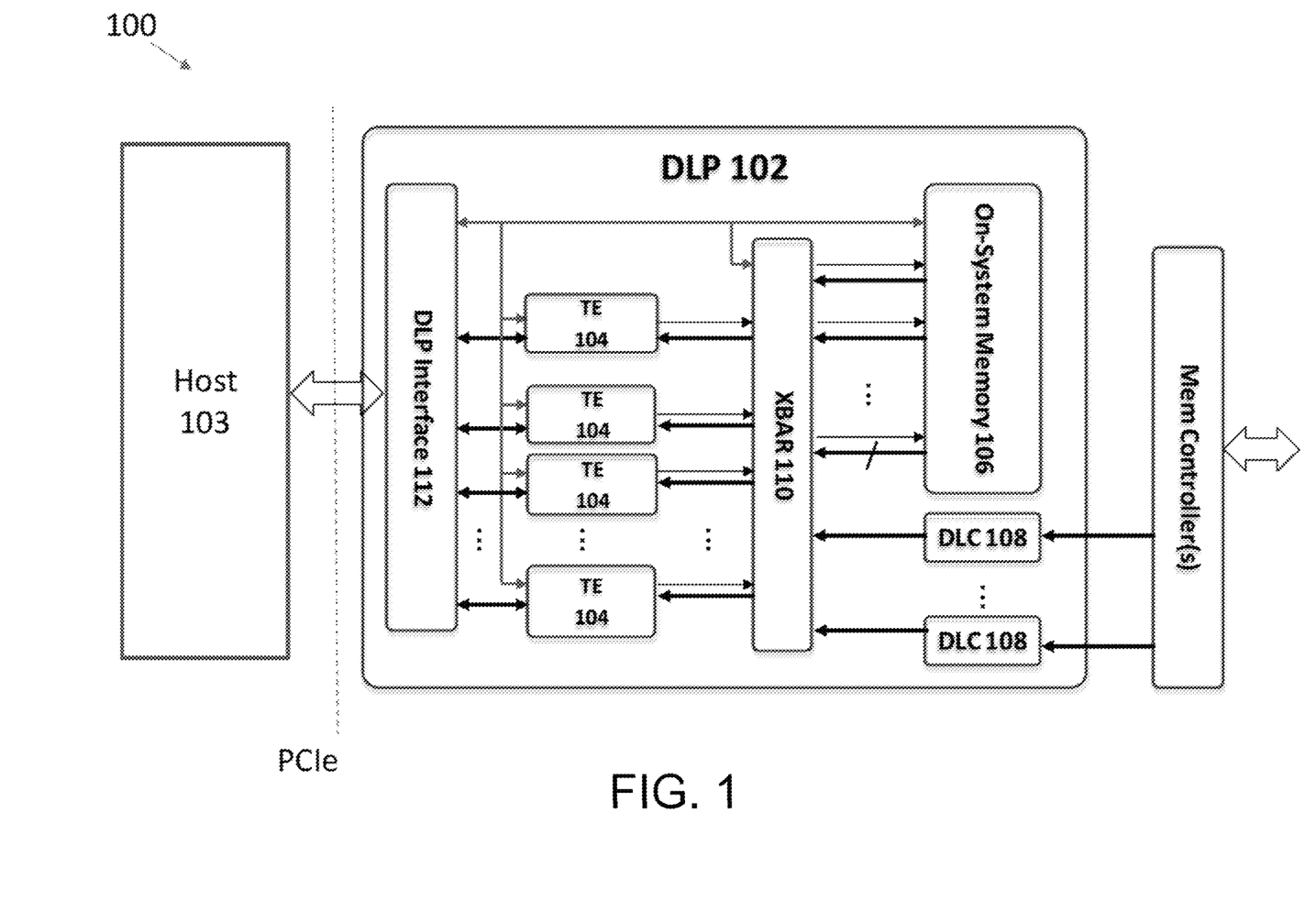
FIG. 1 depicts an example of a diagram of a system configured to support hardware-based deep learning processing in accordance with some embodiments.

FIG. 1 depicts an example of a diagram of a system 100 configured to support hardware-based deep learning processing. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes a hardware-based programmable deep learning processor (DLP) 102, wherein the DLP 102 further includes at least a plurality of tensor engines (TEs) 104, which are dedicated hardware blocks/components each including one or more microprocessors and on-chip memory units storing software instructions programmed by a user for various machine learning operations. When the software instructions are executed by the microprocessors, each of the hardware components becomes a special purposed hardware component for practicing certain deep learning functions as discussed in detail below. The DLP 102 further includes an on-system/on-chip memory (OSM) 106 and one or more deep learning controllers (DLCs) 108 configured to access a plurality of external memory resources (e.g., DRAMs) through multiple input/output channels via memory controller(s).

During its operation, the DLP 102 is configured to accept instructions from a host 103 and submit the instructions to the tensor engines 104 and their respective components in the DLP 102 via a DLP interface 112. In some embodiments, the host 103 is configured to provide separate instructions to each of the components of the DLP 102, wherein formats of the instructions are different for different components. The DLP 102 is also configured to provide deep learning processing results by the DLP 102 back to the host 103 via the DLP interface 112. Here, the host 103 can be, but is not limited to, an x86, OCTEON, or ARM based device/system/server. The interface between the DLP 102 and the host 103 can be but is not limited to a Peripheral Component Interconnect Express (PCIe) bus.

In some embodiments, the DLP 102 adopts a multi-core structure and partitions each neural network processing task for pattern classification among the plurality of tensor engines (TEs) 104, wherein each tensor engine 104 is configured to perform a portion/sub-task of the neural network processing task in parallel. Here, each of the plurality of tensor engines 104 is fully programmable and is configured to retrieve and process input data from the OSM 106 and/or the external memory resources via the DLCs 108, wherein the retrieved data is multiplexed to the tensors engines 104 by a multiplexer/crossbar 110. In some embodiments, the DLP 102 is configured to replicate a sub-task among multiple tensor engines 104 or move a sub-task from one tensor engine 104 to another for efficient use of compute resources. The DLP 102 is configured to distribute the sub-tasks among the tensor engines 104 under both scenarios where the number of sub-tasks is greater than the number of tensor engines 104 and where the number of sub-tasks is fewer than the number of tensor engines 104. For a non-limiting example, a large size image can be broken into a plurality of smaller image portions, wherein the size of each of the image portions matches with the input data width of one tensor engine 104 and is handled by each tensor engine 104.

Figure 2:
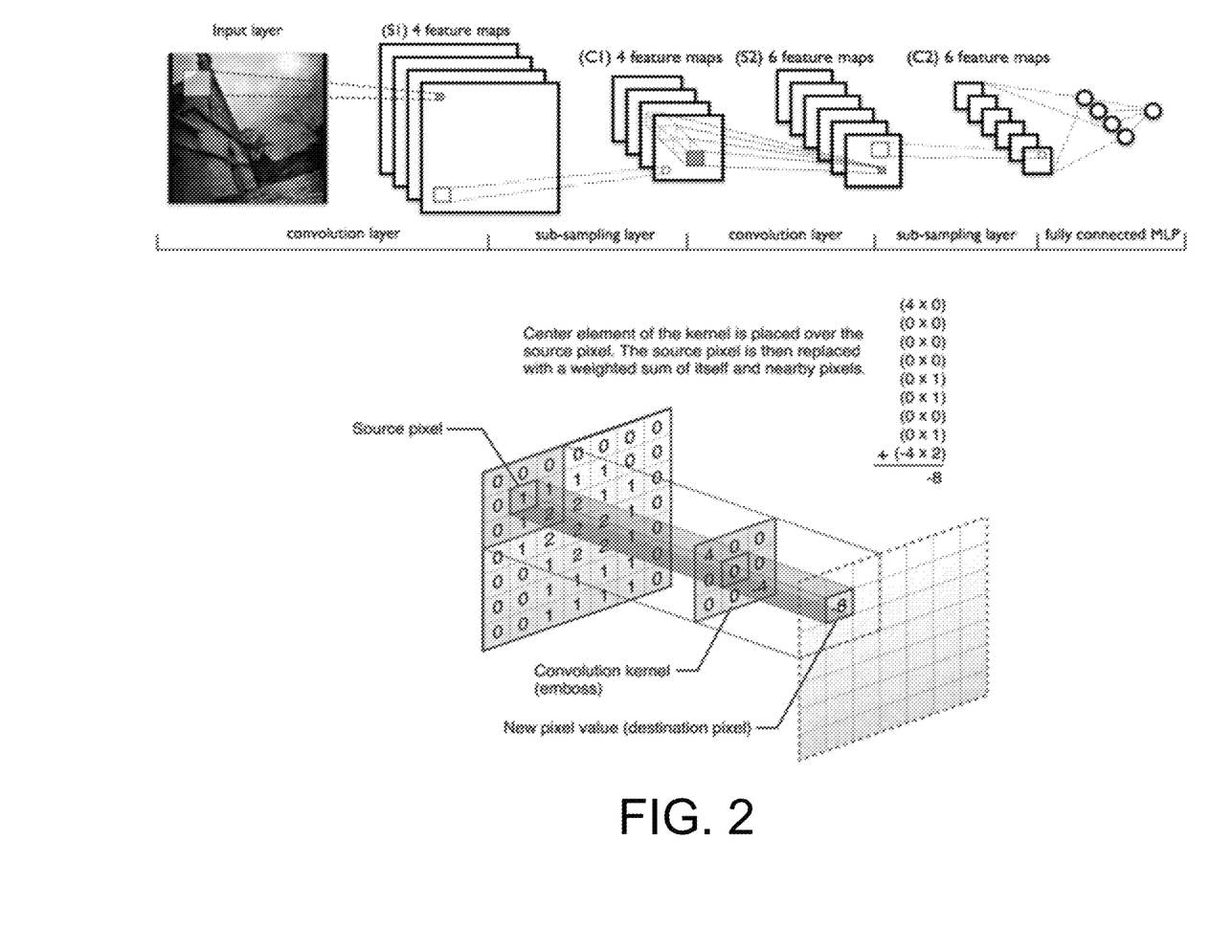
FIG. 2 depicts an example of a convolutional neural network for pattern recognition and classification in accordance with some embodiments.

For deep learning, the DLP 102 is configured to implement one or more neural networks, which are mathematical models that mirror functions of a human brain and are utilized for pattern recognition and classification. Neural networks are typically applied to image/video processing, speech recognition, computer vision, optical character recognition, speech to text, machine translation, search, query to doc relevance, etc. For pattern recognition and classification, e.g., image pattern recognition, a convolutional neural network for convolution operations on input data may have three types of layers—one or more convolutional layers, each of which is configured to apply one or more local filters and/or a non-linear activation function to data from the input layer, one or more pooling (or sub-sampling) layers, each of which is configured to aggregate information/data amongst a set of neighbors of a neuron of the current layer, and one or more classification layers, each of which is configured to perform a linear or multi-layer perceptron (MLP) operation on the FC neural network and apply a non-linear activation function to output from the neuron. In any of the network layers, the non-linear activation function can be implemented as linear interpolation of the function. FIG. 2 depicts an example of a convolutional neural network for pattern recognition and classification. When such convolutional neural network is applied to, for a non-limiting example, an image, one or more kernels are applied to the source pixels on the image for convolution, wherein the center element of each kernel is placed over the source pixel to replace the source pixel with a weighted sum of itself and its neighboring pixels. Here, each kernel is a multi-dimensional (e.g., three- or four-dimension) matrix or template having its own values for elements in the matrix, wherein the dimensions represent (x, y, time) coordinates as well as depth (e.g., color) of the elements of the kernel.

In some embodiments, fast Fourier transform (FFT) can be used for convolution operations. Specifically, Fourier transform decomposes a time-domain signal x(t) into corresponding frequencies that make up the signal in a frequency domain according to the following equation where the time-domain signal is continuous: $\hat{x}(f) = \int_{-\infty}^{\infty} x(t) e^{-2\pi j t f} dt$, where $j \triangleq \sqrt{-1}$ and $e^{j\theta} = \cos\theta + j\sin\theta$. For discrete Fourier transform (DFT) where both the input data and output are discrete samples, e.g., x(n), n=0, 1, ..., N−1, the DFT is defined as $$\hat{x}(k) = \frac{1}{N} \sum_{n=0}^{N-1} x(n) W_N^{nk}, k = 0, \ldots, N-1, \text{ where } W_N \triangleq e^{-\frac{j2\pi}{N}}$$

for DFT (and $$W_N \triangleq e^{\frac{j2\pi}{N}}$$

for inverse DFT). As such, $$\hat{x} = \frac{1}{N} F x,$$

where $$F \triangleq \begin{bmatrix} W_N^{0 \times 0} & W_N^{0 \times 1} & \ldots & W_N^{0 \times (N-1)} \\ W_N^{1 \times 0} & W_N^{1 \times 1} & \ldots & W_N^{1 \times (N-1)} \\ \vdots & \vdots & \ddots & \vdots \\ W_N^{(N-1) \times 0} & W_N^{(N-1) \times 1} & \ldots & W_N^{(N-1) \times (N-1)} \end{bmatrix}$$

The computation complexity of DFT according to the equation above is $O(N^2)$, where N is the number of samples in the input data. Fast Fourier transform (FFT) is often used to compute the DFT of an input sequence or its inverse (IFFT) by decimating the DFT equation either in time or in frequency domain where N can be in the form of $2^M$. In some embodiments, FFT can be implemented via a divide and conquer approach, which breaks down a DFT of size N ($2^M$) into two DFTs of size N/2 each, wherein each of the DFTs can be broken down again recursively. The following equations illustrate using the divide and conquer approach of DFT for decimation in frequency (DIF):

$$\hat{x}(2k) = \frac{1}{N} \sum_{n=0}^{\frac{N}{2}-1} \left[ x(n) + x\left(n + \frac{N}{2}\right) \right] W_{\frac{N}{2}}^{nk}, \quad (1)$$

$$k = 0, \ldots, \frac{N}{2} - 1$$

$$\hat{x}(2k+1) = \frac{1}{N} \sum_{n=0}^{\frac{N}{2}-1} \left[ x(n) - x\left(n + \frac{N}{2}\right) \right] W_N^n W_{\frac{N}{2}}^{nk}, \quad (2)$$

$$k = 0, \ldots, \frac{N}{2} - 1$$

Figure 3:
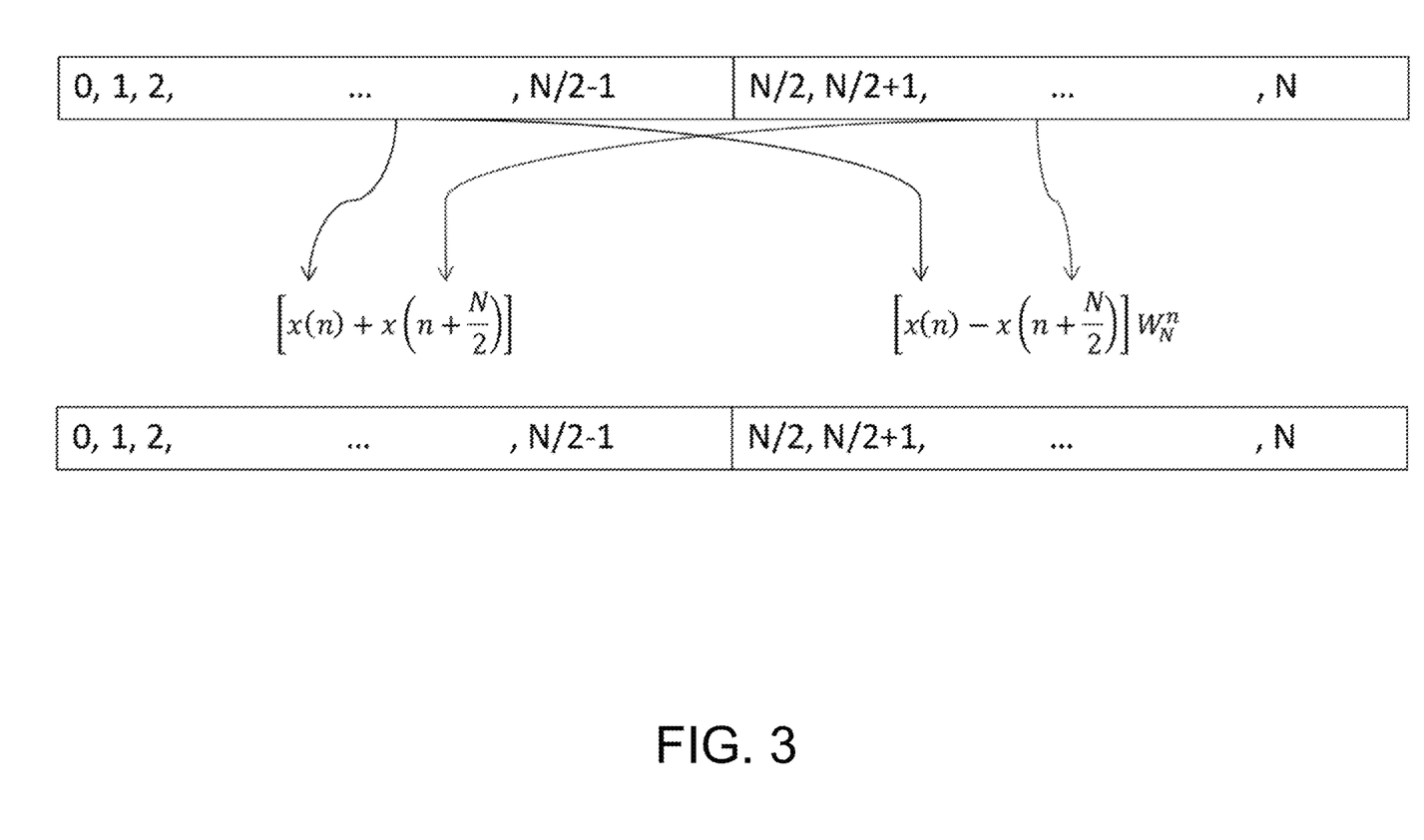
FIG. 3 depicts an example of a butterfly operation for FFT computation in accordance with some embodiments.

As such, the DFT can be computed in $\log_2 N$ stages each with N complex operations with a total complexity of $O(N \log_2 N)$. In some embodiments, the FFT can be computed using a butterfly operation as shown in FIG. 3, which for per pair of samples, computes the FFT based on the equations (1) and (2) above by dividing the samples into two groups of size N/2 each.

In some embodiments, the divide and conquer approach for FFT can be based on any prime factor (e.g., 3, 5, 7) other than 2. In the example where the prime factor is 3, the DFT of size N can be broken down to three DFTs of size N/3 each and the following equations can be adopted for the FFT on each of the DFTs:

$$X(3r) = \frac{1}{N} \sum_{n=0}^{\frac{N}{3}-1} \left[ x(n) + x\left(n + \frac{N}{3}\right) + x\left(n + \frac{2N}{3}\right) \right] W_{\frac{N}{3}}^{nr}, \quad (3)$$

$$r = 0, \ldots, \frac{N}{3} - 1$$

$$X(3r+1) = \frac{1}{N} \sum_{n=0}^{\frac{N}{3}-1} \left[ x(n) + x\left(n + \frac{N}{3}\right)W_3^1 + x\left(n + \frac{2N}{3}\right)W_3^2 \right] W_N^n W_{\frac{N}{3}}^{nr}, \quad (4)$$

$$r = 0, \ldots, \frac{N}{3} - 1$$

$$X(3r+2) = \frac{1}{N} \sum_{n=0}^{\frac{N}{3}-1} \left[ x(n) + x\left(n + \frac{N}{3}\right)W_3^2 + x\left(n + \frac{2N}{3}\right)W_3^1 \right] W_N^{2n} W_{\frac{N}{3}}^{nr}, \quad (5)$$

$$r = 0, \ldots, \frac{N}{3} - 1$$

For FFT on multi-dimensional (e.g., two-dimensional) input signal/data, FFT can be first performed on rows of the data and then on columns of the data to generate a multi-dimensional Fourier space (or "k-space"), which in the case of image data, represents how sharp features are in an image. For FFT on a size N×N image, the following equations are adopted, $$\hat{x}(k, l) = \sum_{m=0}^{N-1} \sum_{n=0}^{N-1} x(m, n) W_N^{mk+nl}, k, l = 0, \ldots, N-1 \quad (6)$$

$$\hat{x}(k, l) = \sum_{m=0}^{N-1} \left[ \sum_{n=0}^{N-1} x(m, n) W_N^{nl} \right] W_n^{mk} \quad (7)$$

where one-dimensional FFT is first computed on N rows, wherein the result of the one-dimensional FFT replaces the data in the matrix followed by one-dimensional FFT on N columns of the data. The total complexity of such two-dimensional FFT is thus $N \times O(N \log_2 N) + N \times O(N \log_2 N) = O(N^2 \log_2 N^2)$.

For a FFT-based convolution operation, FFT is performed on both the kernel and the input (image) data followed by inverse FFT, which output is the result of the convolution. The complexity ratio of the FFT-based convolution operation compared to an ordinary convolution operation is $$\frac{2 \times O(N^2 \times \log_2(N^2)) + O(N^2)}{L^2 \times K^2},$$

where it is assumed the kernel has a size of K×K and the image data has a size of L×L. In some embodiments, sizes of both the kernel and/or the input data can be expanded via, for example, zero-padding, wherein zeros are added to the kernel at border pixels of the image. In some embodiments, the size of the image (also the size of the FFT) is adjusted (expanded) to N, which is in the form of $2^M$. Such kernel and/or image size expansion may lead to improvement in the complexity ratio.

Figure 4:
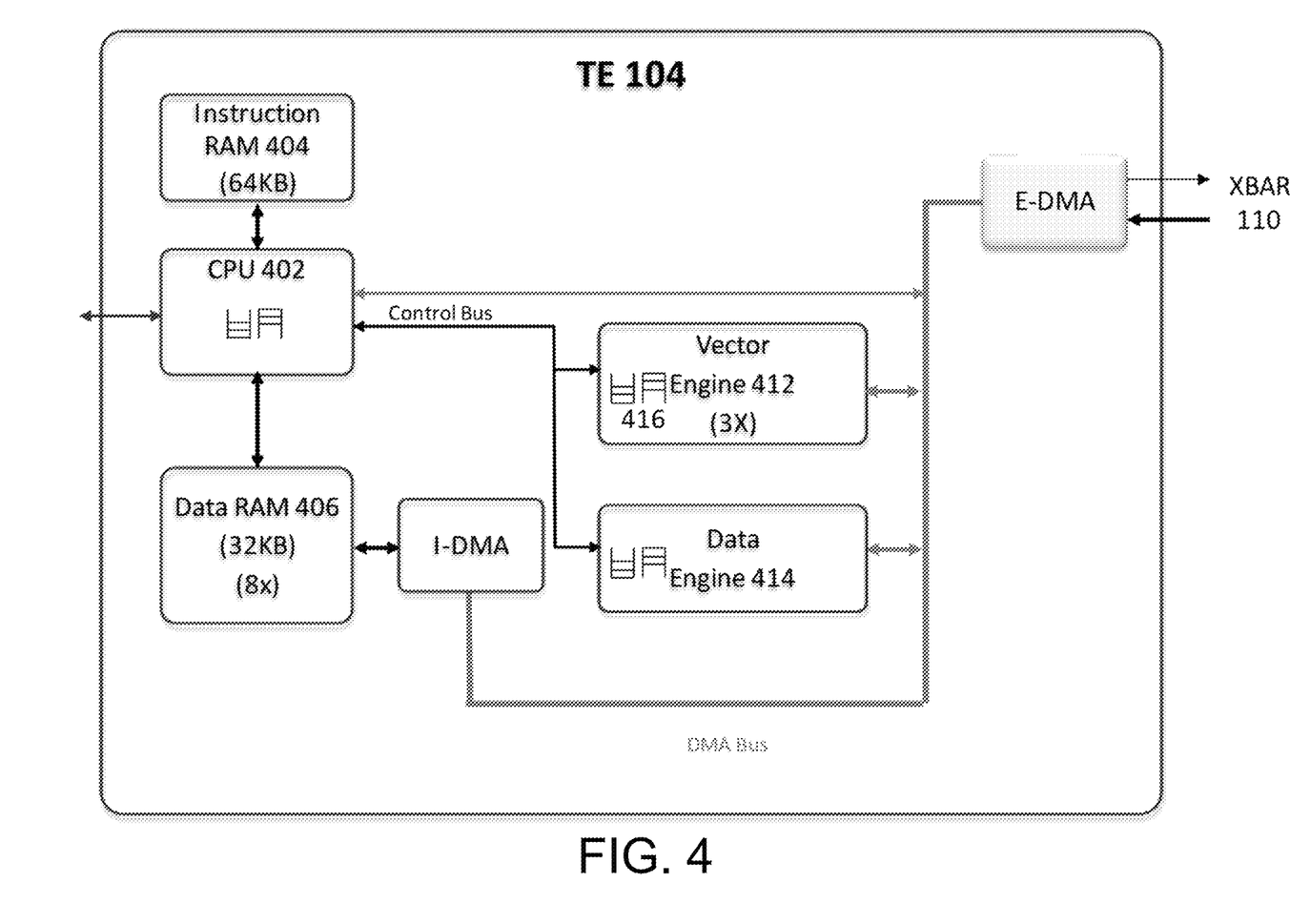
FIG. 4 depicts an example of a block diagram of key components of each tensor engine in accordance with some embodiments.

FIG. 4 depicts an example of a block diagram of key components of each tensor engine 104. As shown by the example of FIG. 4, the tensor engine 104 includes a fully programmable CPU 402 having its own instruction RAM/cache 404 and a data RAM or online memory (OLM) 406 configured to store instructions from the host 103 and retrieve data from the OSM 106 and/or the external memory resources, respectively. For the following discussions, it is assumed that the multiple dimensional (e.g., two-dimensional) samples/input data are stored in the OSM 106 and the OLM 406 in column major (data stored in row major can be handled in a similar fashion). Each tensor engine 104 further includes, among other components, one or more vector processing engines 412 each configured to vectorize multi-dimensional (e.g., 2D or 3D) input data at each layer of the convolutional neural network to generate a plurality of vectors and to perform multi-dimensional FFT on the generated vectors to create output for the convolution operations, and a data engine 414 configured to support prefetching of the multi-dimensional data from the OSM 106 and/or the external memory resources for the convolution operations via direct memory access (DMA). In some embodiments, each vector processing engine 412 is a simplified arithmetic-logic unit (ALU) that handles vector operations only and does not handle loops, branches, and branch predictions to achieve power efficiency.

Figure 5A:
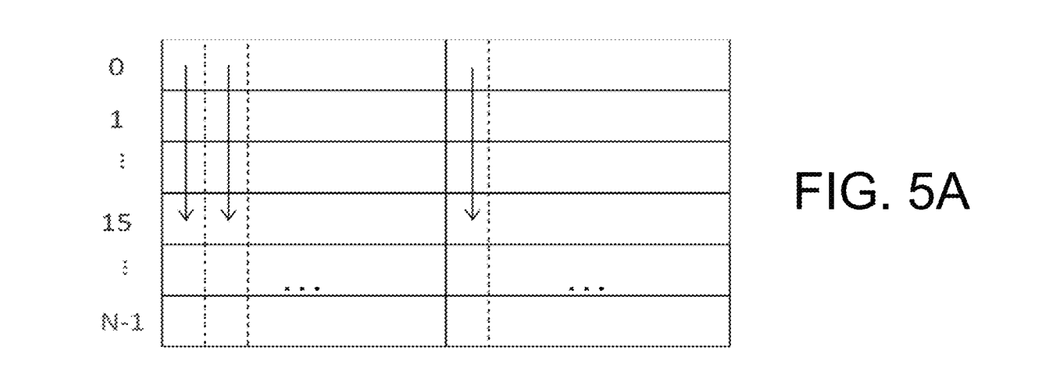
FIG. 5A depicts an example of column-wise vectorization of the input data in accordance with some embodiments.
Figure 5B:
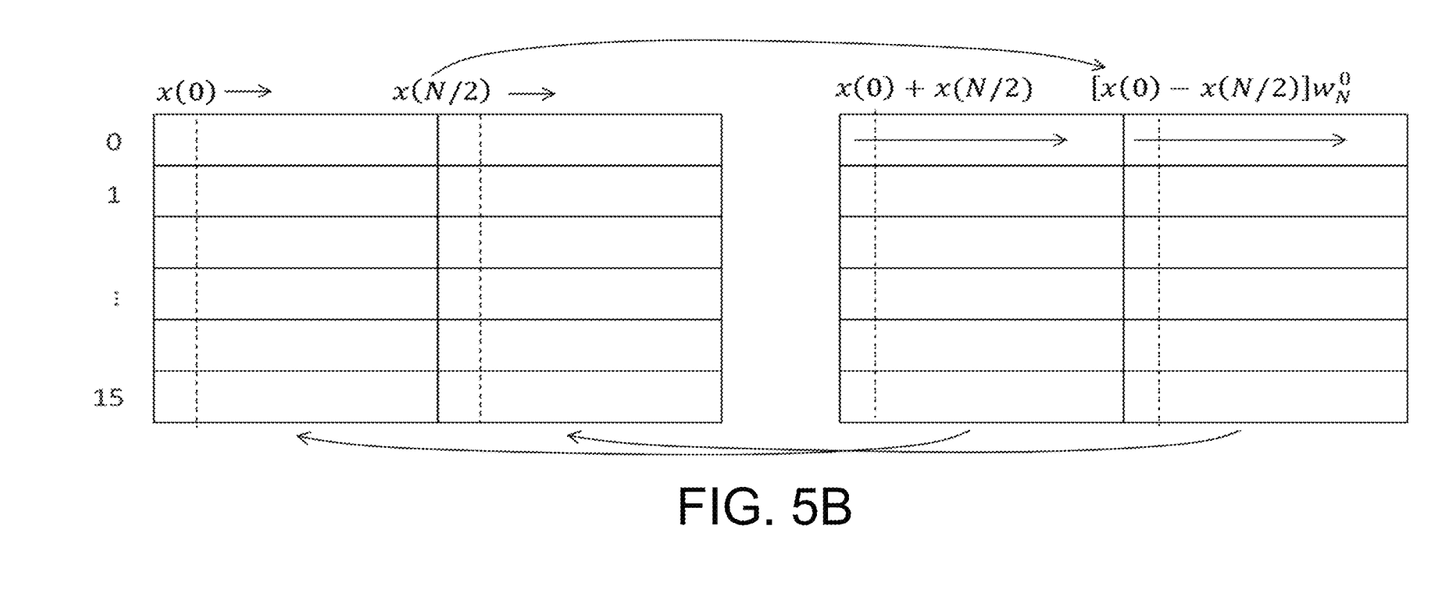
FIG. 5B depicts an example of a butterfly operation on retrieved vectors from each row in accordance with some embodiments.

In some embodiments, each vector processing engine 412 is configured to retrieve a vector of size V of sample data across V out of N rows column-wise from each column of the multi-dimensional input data, one column at a time, from the OSM 106 to OLM 406 via DMA, wherein stride size of the DMA defined as an increment on external address between each consecutive access of the DMA is the column length. FIG. 5A depicts an example of column-wise vectorization of the input data wherein the size of each vector V is 16. In some embodiments, each vector processing engine 412 is configured to perform a butterfly operation on the retrieved vectors of size V, wherein V number of FFTs are performed on each of the V rows of retrieved input data by the vector processing engine 412 in parallel using Equations (1) and (2) above. FIG. 5B depicts an example of a butterfly operation on retrieved vectors of 16 elements one from each row, wherein 16 FFTs are performed on 16 rows by the vector processing engine 412 in parallel. Such vectorized FFT approach saves memory usage during FFT, wherein only two vectors (e.g., x(0) and x(N/2)) need to be loaded from OLM 406 at any time and a first set of (two) vector processing engines 412 are configured to perform the summation and subtraction of the FFT according to Equations (1) and (2) in parallel and save the results of the FFT back to the same location in the memories as the input data is retrieved. In some embodiments, the OLM 406 is configured to keep up to V*N elements so no data transfer is required between the OSM 106 and OLM 406 for memory efficiency.

In some embodiments, when the first set of vector processing engines 412 are halfway through the N retrieved vectors, i.e., completed FFT of a first half of vectors, a second set of vector processing engines 412 can start FFT on the first half of vectors simultaneously in parallel to speed up the FFT as samples for the second half of the vectors are retrieved and processed by the first set of vector processing engines 412. Additional sets of vector processing engines 412 can be recursively applied in a similar fashion (e.g., on first half of the first half, etc.), resulting in completion of the FFT in $2(N/2+N/4+N/8+ \ldots +1=N-1)=2N$ cycles. In some alternative embodiments, the DLP is configured to adopt a radix-4 butterfly, which divides the samples into four groups of N/4 each and utilizes a set of vector processing engines 412 at a time for the FFT, also resulting in completion of the FFT in 2N cycles. Any other radix can be implemented in the same way with the same effect while allowing the vector size V to be of any non-power of 2 factor.

Figure 6:
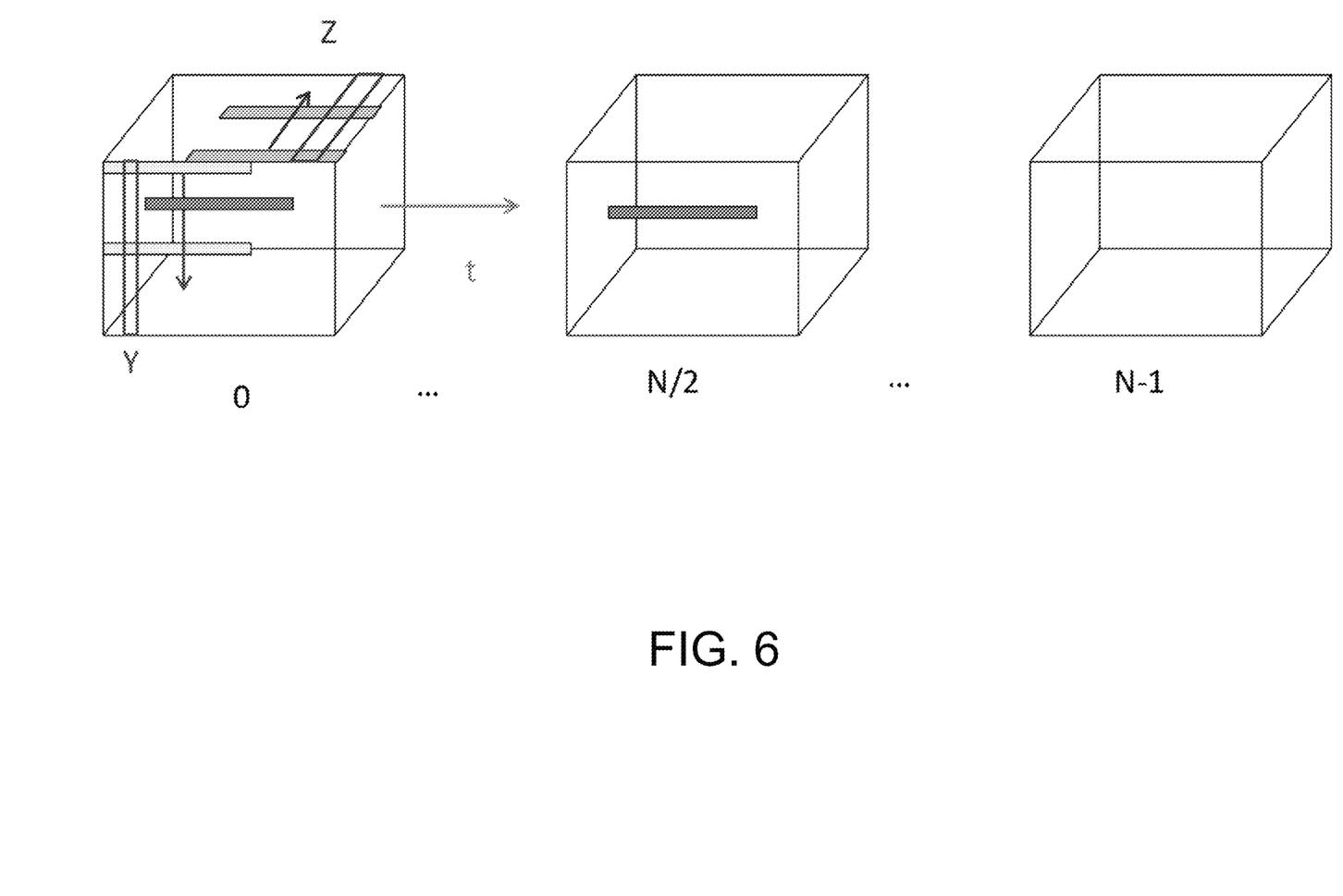
FIG. 6 depicts an example of FFT on input data having more than two-dimensions in accordance with some embodiments.
Figure 7:
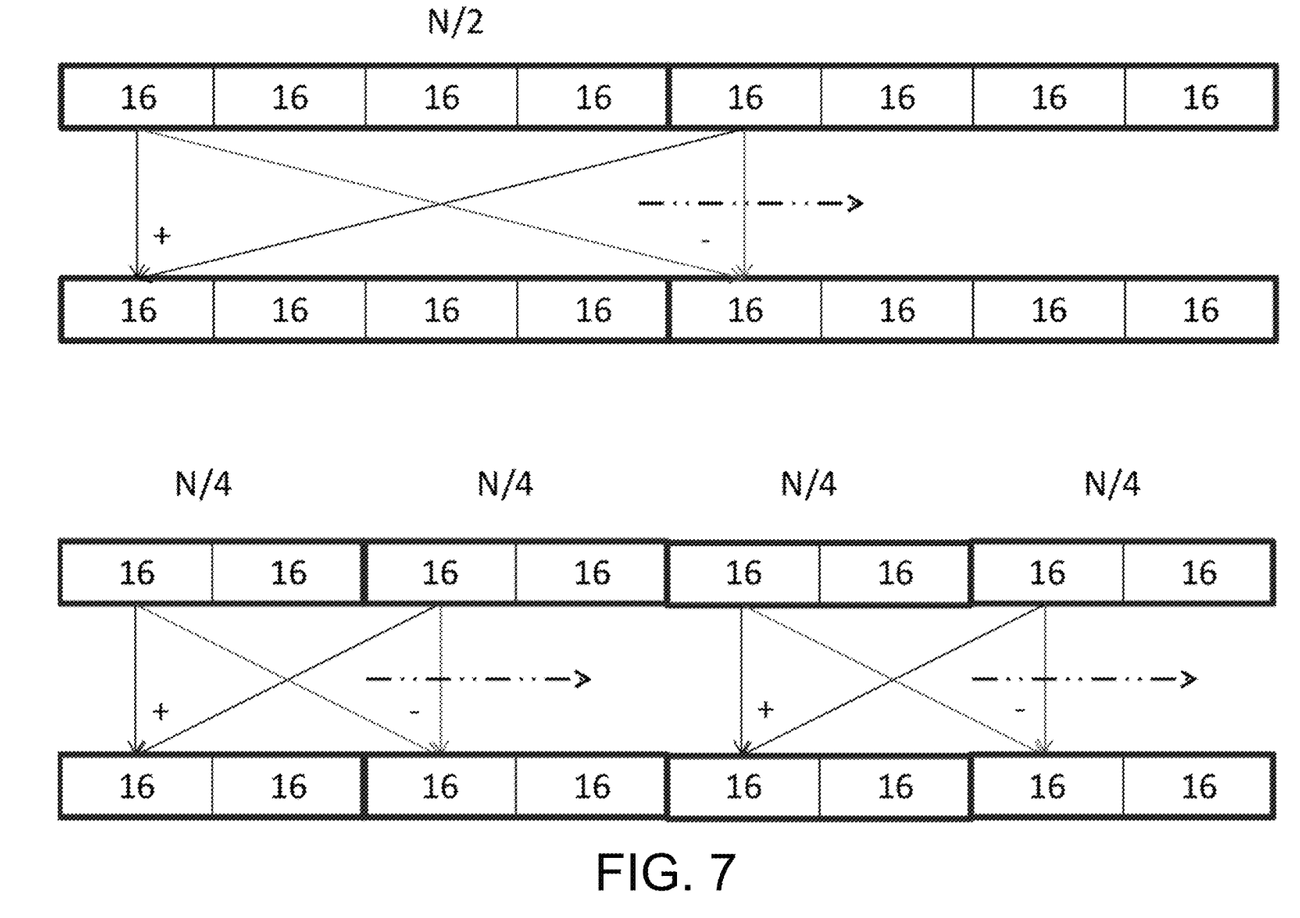
FIG. 7 depicts an example of row FFT on data having more than two-dimensions stored in row major in accordance with some embodiments.

In some embodiments, the vector processing engines 412 are configured to perform FFT on the input data having more than two-dimensions as shown by the example of FIG. 6. Assume data is stored in row major, each vector processing engine 412 is configured to retrieve vectors contiguously from each row and for a four-dimensional data, such vectorization can be done for FFT in three dimensions Y, Z and t (time). For the first dimension (X), each vector processing engine 412 is configured to perform vectorization on a single row by performing a divide and conquer partition on the row until a granularity of S (e.g., 16) elements is reached and then perform the FFT on chunks/vectors of elements across the row. FIG. 7 depicts an example of row FFT on data having more than two-dimensions stored in row major. In some embodiments, each vector processing engine 412 is configured to perform the FFT on the chunks of S elements stored in the OLM 406 when the granularity of elements is reached at $k^{th}$ step of the divide and conquer partition, wherein N/k=S. Under such scenario, the size of each vector processing engine 412 for FFT only needs to have a size of V, which is small relative to the size of the input data N.

Figure 8:
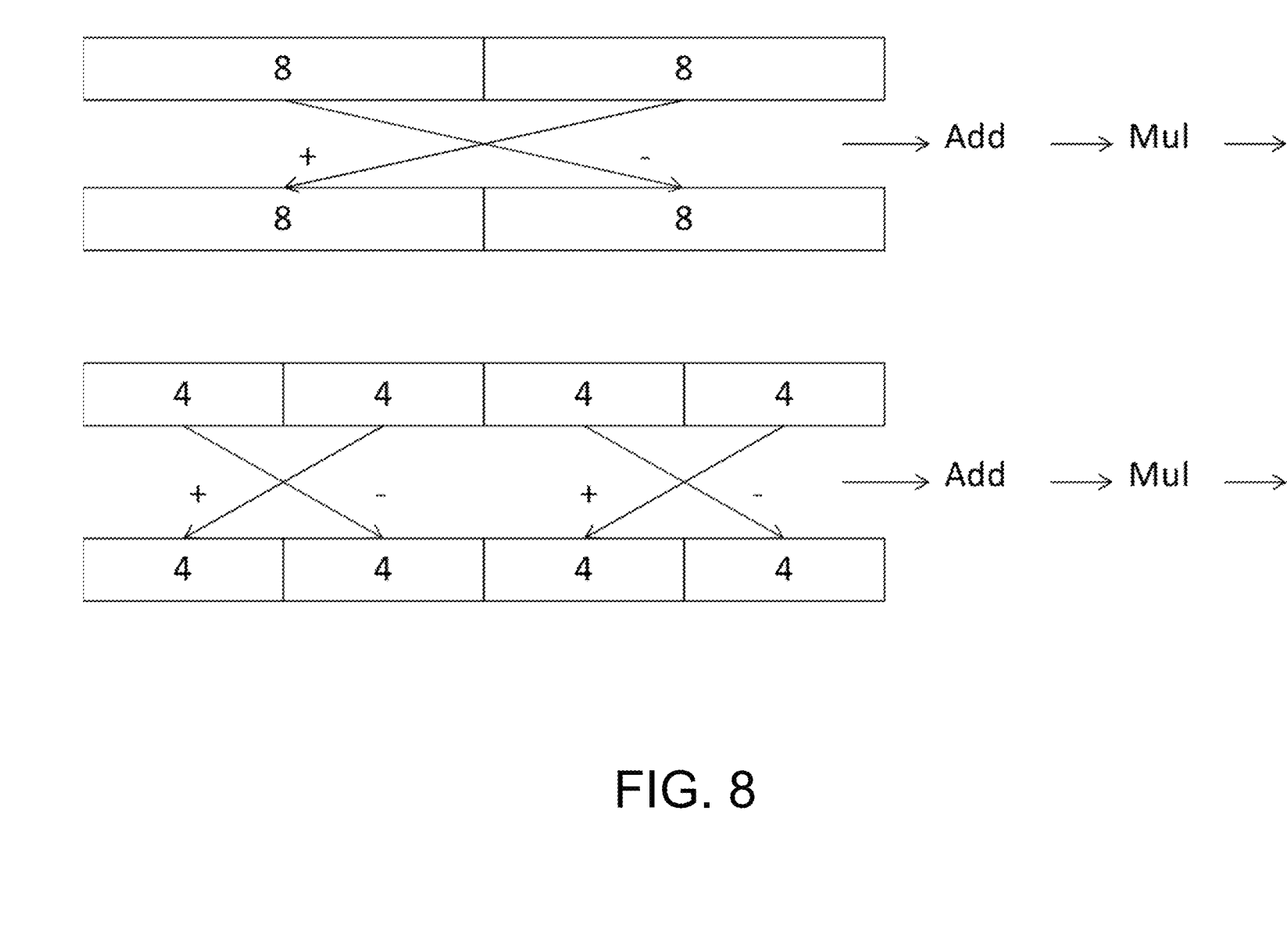
FIG. 8 depicts an example of register level FFT in accordance with some embodiments.

In some embodiments, each vector processing engine 412 is configured to perform the divide and conquer partition on the row to register and/or sub-register level after the granularity of S elements is reached by utilizing a plurality of registers 416 associated with each vector processing engine 412. Each vector processing engine 412 is then configured to perform the FFT on the row data scattered among the registers 416. FIG. 8 depicts an example of register level FFT. As shown by the example of FIG. 8, the row is further divided to segments of 8 elements each and saved to the registers after the granularity of S (e.g., 16) elements is reached, wherein a first/left segment is copied to the right while a second/right segment is copied to the left with an inversion sign applied. The data in the two registers are then added and multiplied according to Equations (1) and (2) and such divide and conquer process may continue to the next/finer granularity (e.g., 4).

Figure 9:
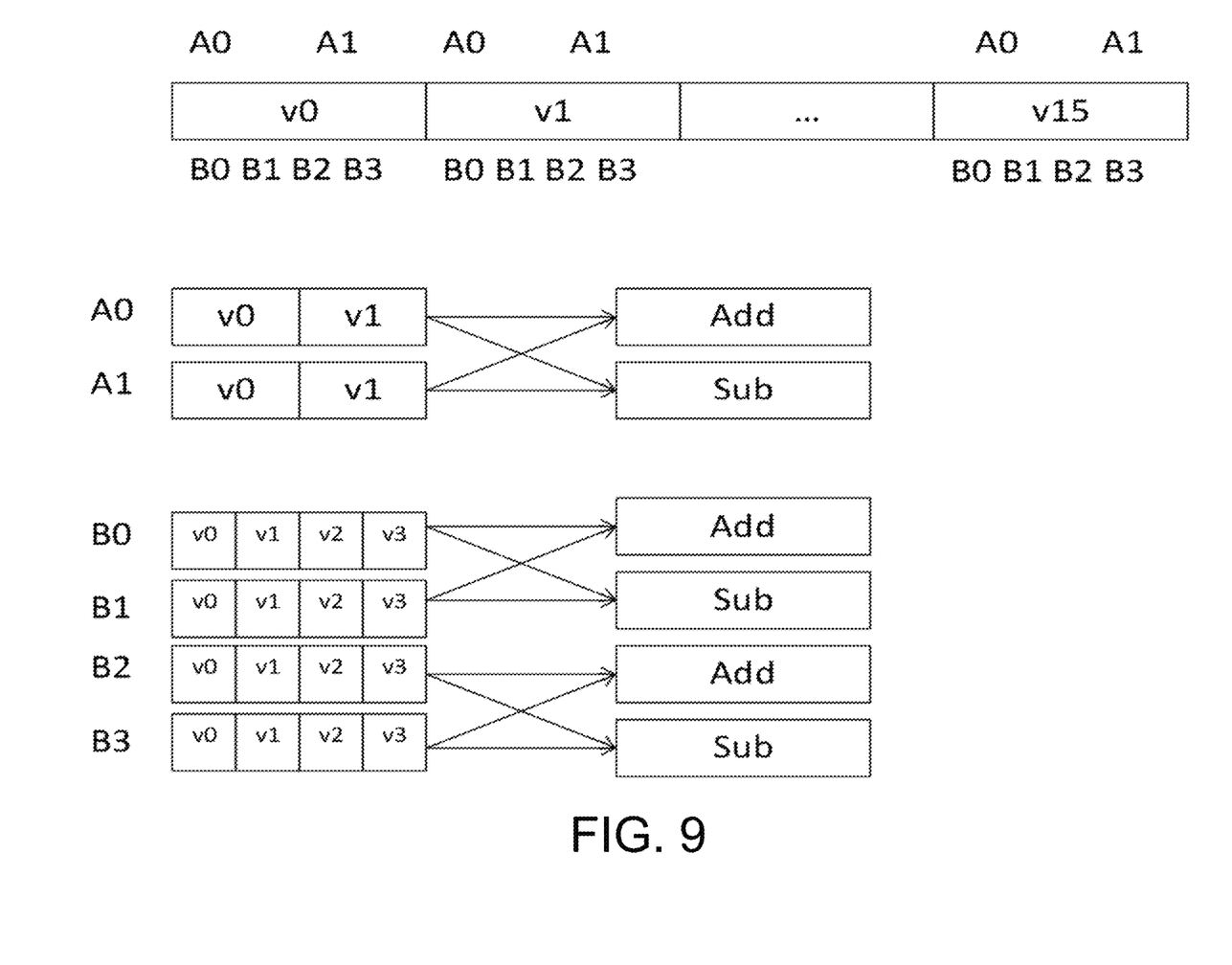
FIG. 9 depicts an example of mixed memory and register level FFT in accordance with some embodiments.

In some embodiments, each vector processing engine 412 is configured to perform the FFT on the row data scattered among both the OLM 406 and the registers 416. FIG. 9 depicts an example of mixed memory and register level FFT. When the row length is less than the granularity S (e.g., 16), which represents the number of vectors to be processed in parallel, more rows can be concatenated together in a row to reach the set granularity. After S number of registers are populated with the data, add and subtract operations can be performed by the vector processing engine 412 followed by multiplications. After the FFT is done, the results can be saved back to the same location in the memories from which the data is retrieved.

Figure 10:
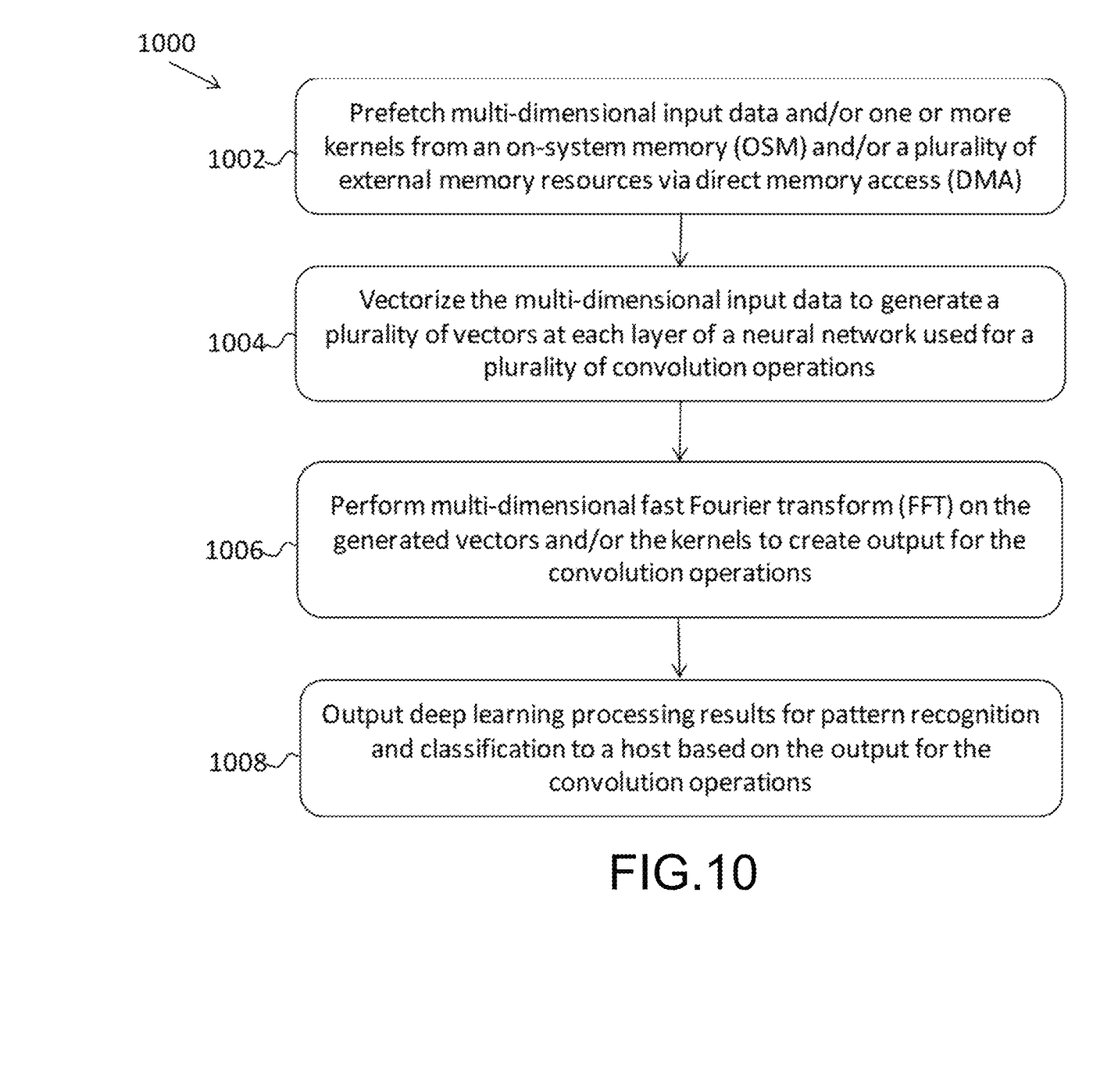
FIG. 10 depicts a flowchart of an example of a process to support vectorized FFT for multi-dimensional convolution in accordance with some embodiments.

FIG. 10 depicts a flowchart of an example of a process to support vectorized FFT for multi-dimensional convolution. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 10, the flowchart 1000 starts at block 1002, where multi-dimensional input data and/or one or more kernels are prefetched from an on-system memory (OSM) and/or a plurality of external memory resources via direct memory access (DMA). The flowchart 1000 continues to block 1004, where the multi-dimensional input data is vectorized to generate a plurality of vectors at each layer of a neural network used for a plurality of convolution operations. The flowchart 1000 continues to block 1006, where multi-dimensional fast Fourier transform (FFT) is performed on the generated vectors and/or the kernels to create output for the convolution operations. The flowchart 1000 ends at block 1008, where deep learning processing results for pattern recognition and classification is outputted to a host based on the output for the convolution operations.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments, and the various modifications that are suited to the particular use contemplated.

What is claimed is:

1. A hardware-based programmable deep learning processor (DLP), comprising:
   an on-system memory (OSM) and one or more controllers configured to access a plurality of external memory resources via direct memory access (DMA);
   a plurality of programmable tensor engines configured to perform a plurality of convolution operations by applying one or more kernels on multi-dimensional input data to generate deep learning processing results for pattern recognition and classification based on a neural network, wherein each of the plurality of tensor engines further comprises:
      a data engine configured to prefetch the multi-dimensional input data and/or the kernels from the OSM and/or the external memory resources for the convolution operations;
      one or more vector processing engines each configured to:
         vectorize the multi-dimensional input data at each layer of the neural network to generate a plurality of vectors;
         perform multi-dimensional fast Fourier transform (FFT) on the generated vectors and/or the kernels to create output for the convolution operations;
      a programmable CPU having its own instruction cache and data cache configured to store a plurality of instructions from a host and the retrieved data from the OSM and/or the external memory resources, respectively.

2. The processor of claim 1, wherein:
   the DLP is configured to accept the plurality of instructions from the host and submit the instructions to program the tensor engines and their respective components in the DLP, wherein the instructions are stored in the instruction cache of the tensor engines.

3. The processor of claim 1, wherein:
   the DLP is configured to provide the deep learning processing results by the DLP back to the host.

4. The processor of claim 1, wherein:
   the DLP is configured to partition each convolution operation for pattern classification among the plurality of vector processing engines, wherein each vector processing engine is configured to perform a sub-task of the convolution operation in parallel.

5. The processor of claim 1, wherein:
   each kernel is a multi-dimensional matrix having its own values for elements in the matrix, wherein the dimensions represent (x, y, time) coordinates as well as depth of the elements of the kernel.

6. The processor of claim 1, wherein:
   each tensor engine further includes an online memory (OLM) configured to store the prefetched input data from the OSM and/or the external memory resources.

7. The processor of claim 6, wherein:
   each vector processing engine is configured to retrieve a vector of input data across V out of N rows column-wise from each column of the multi-dimensional input data, one column at a time, wherein the multiple dimensional input data is stored in the OSM or the OLM in column major.

8. The processor of claim 7, wherein:
   each vector processing engine is configured to:
      perform divide and conquer to partition the retrieved vectors based on a primary factor;
      perform a butterfly operation on the partitioned vectors, wherein V number of FFT operations are performed on each of the V rows of retrieved input data in parallel and only the primary factor number of partitioned vectors need to be loaded from the memory for the FFT;
      store output from the FFT back to the same location in the memory as the input data is retrieved.

9. The processor of claim 8, wherein:
   multiple set of vector processing engines each having the primary factor number of vector processing engines are applied to perform the FFT operations on the partitioned vectors simultaneously in parallel.

10. The processor of claim 1, wherein:
    the vector processing engines are configured to perform the FFT on the input data having more than two-dimensions.

11. The processor of claim 10, wherein:
    each vector processing engine is configured to:
       retrieve the vectors contiguously from each row of the multi-dimensional input data for FFT except for the first dimension;
       perform vectorization on a single row of the first dimension by performing a divide and conquer partition on the row until a granularity of S elements is reached;
       perform the FFT on vectors of elements across the row of the first dimension.

12. The processor of claim 11, wherein:
    each vector processing engine is configured to perform the divide and conquer partition on the row to register and/or sub-register level after the granularity of S elements is reached by utilizing a plurality of registers associated with each vector processing engine.

13. A method to support hardware-based programmable vectorized fast Fourier transform (FFT) for multidimensional convolution, comprising:
    prefetching multi-dimensional input data and/or one or more kernels from an on system memory (OSM) and/or a plurality of external memory resources via direct memory access (DMA);
    accepting a plurality of instructions from a host and submitting the instructions to program a plurality of vector processing engines for the vectorized FFT for multi-dimensional convolution;
    vectorizing the multi-dimensional input data to generate a plurality of vectors at each layer of a neural network used for a plurality of convolution operations;
    performing multi-dimensional FFT on the generated vectors and/or the kernels to create output for the convolution operations;
    outputting deep learning processing results for pattern recognition and classification to a host based on the output for the convolution operations.

14. The method of claim 13, further comprising:
    partitioning each convolution operation for pattern classification among the plurality of vector processing engines, wherein each vector processing engine is configured to perform a sub-task of the convolution operation in parallel.

15. The method of claim 13, wherein:

each kernel is a multi-dimensional matrix having its own values for elements in the matrix, wherein the dimensions represent (x, y, time) coordinates as well as depth of the elements of the kernel.

16. The method of claim 13, further comprising:

retrieving a vector of input data across V out of N rows column-wise from each column of the multi-dimensional input data, one column at a time, wherein the multiple dimensional input data is stored in the OSM or an online memory (OLM) in column major.

17. The method of claim 16, further comprising:

performing divide and conquer to partition the retrieved vectors based on a primary factor;

performing a butterfly operation on the partitioned vectors, wherein V number of FFT operations are performed on each of the V rows of retrieved input data in parallel and only the primary factor number of partitioned vectors needs to be loaded from the memory for the FFT;

storing output from the FFT back to the same location in the memory as the input data is retrieved.

18. The method of claim 17, further comprising:

applying multiple set of vector processing engines each having the primary factor number of vector processing engines to perform the FFT operations on the partitioned vectors simultaneously in parallel.

19. The method of claim 13, further comprising:

performing the FFT on the input data having more than two-dimensions.

20. The method of claim 19, further comprising:

retrieving the vectors contiguously from each row of the multi-dimensional input data for FFT except for the first dimension;

performing vectorization on a single row of the first dimension by performing a divide and conquer partition on the row until a granularity of S elements is reached;

performing the FFT on vectors of elements across the row of the first dimension.

21. The method of claim 20, further comprising:

performing the divide and conquer partition on the row to register and/or sub-register level after the granularity of S elements is reached by utilizing a plurality of registers.

* * * * *